United States Patent Office 2,843,453
Patented July 15, 1958

2,843,453

SEPARATION OF PLUTONYL IONS

Robert E. Connick and William H. McVey, Berkeley, Calif., assignors to the United States of America as represented by the United States Atomic Energy Commission No Drawing. Application April 18, 1947
Serial No. 742,450

3 Claims. (Cl. 23—14.5)

The invention relates to novel alkaline earth metal compounds of plutonium and to methods of utilizing the same in plutonium separation processes.

A great deal of work has been carried out in solving the problem of separating plutonium from uranium and radioactive fission products which are constituents of the uranium mass upon its removal from a neutronic reactor. Various methods of separation have included those based on adsorption, electrodeposition, and distillation of plutonium from the mass. However, the most successful methods at present are based upon oxidation-reduction reactions of plutonium and precipitation of plutonium compounds. It has been found that plutonium has at least two states of oxidation. In lower states of oxidation, plutonium has a valence of $+3$ and $+4$ and is substantially insoluble in water as a phosphate or fluoride. In its higher state of oxidation plutonium is water soluble as a phosphate or fluoride but forms an insoluble complex acetate. In the higher state of oxidation plutonium has a valence of $+6$ and this oxidized plutonium is capable of forming a plutonyl ion having a probable structure $PuO_2^{++}$. It has been found that by the use of suitable oxidizing and reducing agents the oxidation state of plutonium may be changed without affecting the oxidation state of uranium. Thus, by converting the plutonium to the $Pu^{+4}$ state without changing the uranium from its $+6$ oxidation state, plutonium may be precipitated as the phosphate or fluoride from a solution containing plutonium, uranium and fission products, leaving uranium in solution together with most of the fission products. Several of the fission products, however, are insoluble as phosphates especially Zr and Cb, and these will precipitate with plutonium in the $+4$ state. These combined plutonium and fission products phosphates are then dissolved in an acid solution, and the plutonium is oxidized to the $+6$ valence state. The plutonium may then be separated from these fission products either by precipitating the plutonium as the sodium plutonyl acetate, or the fission products may be precipitated from the solution as the phosphates or fluorides, leaving the $Pu^{+6}$ in solution.

Because of the very minute quantities of plutonium usually contained in the mass obtained from a neutronic reactor it is not feasible to precipitate plutonium directly from a solution obtained by dissolving this mass with a suitable inorganic acid. Plutonium may, however, be separated from uranium, decontaminated and concentrated by the use of carrier precipitate techniques. It has been found that certain precipitates called "carriers" will carry plutonium ions from solution; thus, bismuth phosphate has been found to carry the $Pu^{+4}$ ion and sodium uranyl acetate has been found to carry the $Pu^{+6}$ ion. There are also numerous other precipitates which will carry plutonium but the two above-mentioned have been found to be especially satisfactory carriers. By the use of these carriers and alternate oxidation-reduction cycles plutonium may be concentrated sufficiently so that it may be precipitated directly from solution.

In the oxidation-reduction method of separation of plutonium, a process used is the bismuth phosphate-sodium uranyl acetate process. In this process the uranium mass is removed from the neutronic reactor, and dissolved in nitric acid to give a solution containing uranyl nitrate, plutonium in the $+4$ state and ions of radioactive fission products. A bismuth phosphate precipitate is formed in this solution and separated therefrom carrying with it plutonium and certain of the fission products which form insoluble phosphates. The bismuth phosphate precipitate is dissolved in nitric or other suitable acid, and the plutonium is oxidized to its $+6$ state. A second bismuth phosphate precipitate is then formed and separated from the solution carrying with it phosphate insoluble fission products and leaving $Pu^{+6}$ ions in solution. This oxidation-reduction cycle may be repeated, until a solution is obtained substantially free of fission products. The solution, however, usually contains plutonium in such dilute concentrations that it is necessary to concentrate it before it may be separated from the solution by direct precipitation. This may be accomplished by oxidizing the plutonium to the $+6$ state and forming a carrier precipitate of sodium uranyl acetate. This precipitate is separated and dissolved in nitric acid after which the plutonium may be reduced and the sodium uranyl acetate precipitated from solution, leaving the $Pu^{+4}$ ion in solution.

It is often desirable to convert the $Pu^{+4}$ ion to the $Pu^{+6}$ ion. This is usually accomplished by the oxidation of the $Pu^{+4}$ ion with a suitable oxidizing agent such as $Cr_2O_7^=$ or $BiO_3^-$ according to the following reactions.

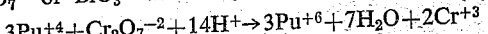

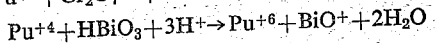

In order to obtain plutonyl ions free of excess oxidizing agents and reduction products it is customary to precipitate the plutonyl ion as the sodium plutonyl acetate $NaPuO_2Ac_3$. This precipitate is then dissolved in an inorganic acid to obtain a solution containing the plutonyl ions. It is often desirable, however, to obtain a plutonyl ion solution free from the acetate ion and this object may be accomplished advantageously by employing the process of this invention.

It is a further object of this invention to provide a simplified method of converting plutonous ions to plutonyl ions contained in a solution free of oxidizing agents.

It is an additional object of this invention to provide, as new compositions of matter, alkaline earth metal plutonates, and suitable methods for preparing such plutonates.

The alkaline earth plutonates, which are the subject of this invention, are comprised of compounds consisting of an atom or atoms of, an alkaline earth metal, hexavalent plutonium, and oxygen combined with or free of water of crystallization. These compounds may be precipitated from an acidic solution containing the plutonyl ions, by the addition of a soluble salt of an alkaline earth metal, such as the nitrate or chloride, and the conversion of the acid solution to an alkaline state, by suitable means, such as the addition of $NH_4OH$ or preferably $NaOH$. The addition of a soluble alkaline earth compound, and conversion of the solution from an acid to an alkaline state, may be carried out simultaneously, by the addition of the hydroxide of the alkaline earth metal, such as $Ba(OH)_2$, $Ca(OH)_2$ or the like.

The resulting precipitates are commonly mixtures of compounds having different ratios of plutonyl groups, and alkaline earth groups, and may or may not contain water of crystallization, with the result that the over-all ratios are generally non-integral. These compounds are of two general types; the mono-plutonate, $MPuO_4$ and the polyplutonate $(MO)_n \cdot (PuO_3)_m$, where M represents an alkaline earth metal, and $n$ and $m$ are small whole numbers.

The barium plutonates range in color from light brown to dark red-brown. Extensive solubility determinations have been made with the barium, magnesium and calcium plutonates, and although the solubilities varied somewhat with the methods of preparation and the length of time for which they were maintained in the solution, it was found that these plutonates were generally quite insoluble, with barium plutonate prepared with NaOH being particularly insoluble and under optimum conditions having a solubility as small or smaller than that of barium sulfate.

The solubility and stability of the plutonates are somewhat dependent upon the method of formation, particularly with reference to the method of converting the plutonyl solution from acidic to basic. Thus, where the plutonates are precipitated in a solution made basic with $NH_4OH$, the solubilities are somewhat higher than for plutonates formed in a solution prepared with NaOH. The plutonates prepared with $NH_4OH$ also tended to dissolve somewhat under washing, in contrast to the plutonates prepared by the use of NaOH which were stable under washing. It is, therefore, generally preferable to use NaOH rather than $NH_4OH$ in the preparation of the plutonates. There may, however, be special cases where the $NH_4OH$ is preferable, such as where the plutonyl solution is prepared by the oxidation of $Pu^{+4}$ with the argentic ion. The solubility of the plutonates also varies somewhat with the time interval during which they are in equilibration with the precipitating medium and it is generally desirable to permit the precipitate to remain in contact with the supernatant liquid for one or several hours before separating the precipitate. The insolubility characteristics of these new compounds of matter have made them particularly useful in the precipitation of the plutonyl ions where they are present in very small concentrations. This is particularly true of the barium plutonates which have exhibited solubilities as low as 0.00171 gm. Pu/l.

The formation of the plutonates may be illustrated by the following examples.

EXAMPLE I

A solution of plutonium in nitric acid solution was oxidized to $Pu^{+6}$ by $BrO_3^-$. $Ba(NO_3)_2$ was then added to the solution to furnish the barium ion and an excess of NaOH was introduced into the solution. A reddish brown precipitate of barium plutonate was formed.

EXAMPLE II $Pu^{+6}$ contained in a nitric acid solution was titrated with $Ba(OH)_2$ to an acidity value of pH 11.3 and the solution was then heated to 90° C. for two hours and allowed to stand for nine days at room temperature. The pH after the nine days was approximately 10, and the solubility of the barium plutonate, which was a reddish-brown precipitate, was 0.15 g./l.

EXAMPLE III 0.48 ml. of solution containing 1.2 mg. of $Pu^{+6}$ with an acid concentration of 0.31 M HCl was prepared, to this was added sufficient barium chloride to give a concentration of 0.26 M. The $OH^-$ concentration was adjusted to 0.1 M by the addition of 0.02 ml. of 10 M NaOH. Barium ion concentration of the solution at this stage was 0.25 M. A dark brown precipitate formed immediately. The precipitate was separated and the solubility determined immediately after separation to be 35 mg. Pu/l. After 14 hours the solubility was found to be only 12 mg. Pu/l.

The following tables will illustrate the solubility of the various alkali metal plutonates. The method of preparation is indicated in the heading of the tables.

Table I.—Solubility of barium plutonate in NaOH

[$Ba(NO_3)_2$ 0.1 M; Pu(VI) ca. 0.46 g./l.; NaOH 1 M]

| Time of Sampling | Solubility (mg. Pu/l.) |
|---|---|
| 0 | 141 |
| 15 min | 142 |
| 30 min | 129 |
| 1 hr | 77.3 |
| 1½ hrs | 64.9 |
| 2½ hrs | 54.6 |
| 3½ hrs | 22.7 |
| 19½ hrs | 1.71 |

Table II.—Solubility of magnesium plutonate in ammonia

[$Mg(NO_3)_2$ 0.1 M; Pu(VI) 0.46 g./l.; ca. 6 M $NH_4OH$]

| Time of Sampling | Solubility (mg. Pu/l.) |
|---|---|
| 5 min | 69.2 |
| 15 min | 49.3 |
| 30 min | 36.4 |
| 1 hr | 39.3 |
| 2¼ hrs | 63.9 |

Table III.—Solubility of calcium plutonate in ammonia

[$Ca(NO_3)_2$ 0.1 M; Pu(VI) 0.46 g./l.; ca. 5 M $NH_4OH$]

| Time of Sampling | Solubility (mg. Pu/l.) |
|---|---|
| 10 min | 338 |
| 30 min | 313 |
| 1 hr | 290 |
| 1½ hrs | 332 |
| 2½ hrs | 316 |
| 6¼ hrs | 411 |
| 42¾ hrs | 536 |

Another aspect of this invention has to do with procedures for the recovery of plutonium from solutions containing plutonium in the +6 oxidation state. In the recovery of plutonium from neutron irradiated uranium by the sodium uranyl-acetate decontamination and concentration procedures previously described, a solution containing plutonium uncontaminated by fission products may be obtained by dissolving a sodium plutonyl acetate obtained by the above process in an inorganic acid solution. Plutonium ion is usually present in this solution in very small concentrations and to separate the plutonium from solution quantitatively by direct precipitation methods, it is necessary to form a plutonium compound with a very low solubility. The new compositions of matter which are the subject of this invention are particularly suited for this purpose and the separation may be made by the following method. A soluble alkaline earth compound and preferably barium chloride or nitrate is added to the acid solution containing the plutonyl ion. The acidity of the solution is then neutralized with a base, preferably NaOH, and excess NaOH is added until the precipitate of barium plutonate forms. The solution may be heated to promote formation of the plutonate if desired. The plutonate may be separated at once by usual separation methods such as centrifugation, filtration, or decantation but it has been found preferable to permit the precipitate to remain in contact with the supernatant for several hours, as this tends to increase the insolubility of the precipitate formed.

Although the process of this invention is illustrated above with plutonium as the transuranic metal, it may also be used equally well for the separation of neptunium from fission products. Numerous modifications will be readily apparent to persons skilled in the art and the above detailed descriptions are given for purposes of illustration only and the invention is to be limited solely by the scope of the appended claims.

What is claimed is:

1. A process of separating plutonyl ions from acetic acid anions contained in an aqueous acidic solution, comprising adding a soluble barium mineral acid salt to said solution, alkalizing said solution whereby a plutonium-containing precipitate forms, and separating said precipitate from the acetic-acid-anions-containing solution.

2. The process of claim 1 wherein the solution is alkalized by the addition of sodium hydroxide while the solution is at elevated temperature.

3. The process of claim 1 wherein the solution with the formed precipitate is allowed to digest for several hours prior to separating the precipitate.

References Cited in the file of this patent

Friend: Textbook of Inorganic Chemistry, vol. 7, part 3, page 308 (1926); publ. by Charles Griffin & Co., Ltd., London.

Deming: General Chemistry, 3rd ed., page 344 (1930); publ. by John Wiley & Sons, New York, N. Y.

Villar: Journal of Chemical Education, vol. 19, pp. 329–330 (1942).

Seaborg: Chemical and Engineering News, vol. 23, No. 23, pp. 2190–2193 (1945).

Connick et al.: MDDC–335, 3 pages, July 2, 1946.

Seaborg et al.: "The Transuranium Elements," part I, pp. 530, 549, 602–607, 830 (1949), 1st ed.; McGraw-Hill Book Co., Inc. New York, N. Y.